Feb. 25, 1936.    E. S. CORNELL, JR    2,031,932
COMBINED DIVERTING AND HOT-COLD CONTROL FIXTURE
Filed Jan. 23, 1934    2 Sheets-Sheet 1
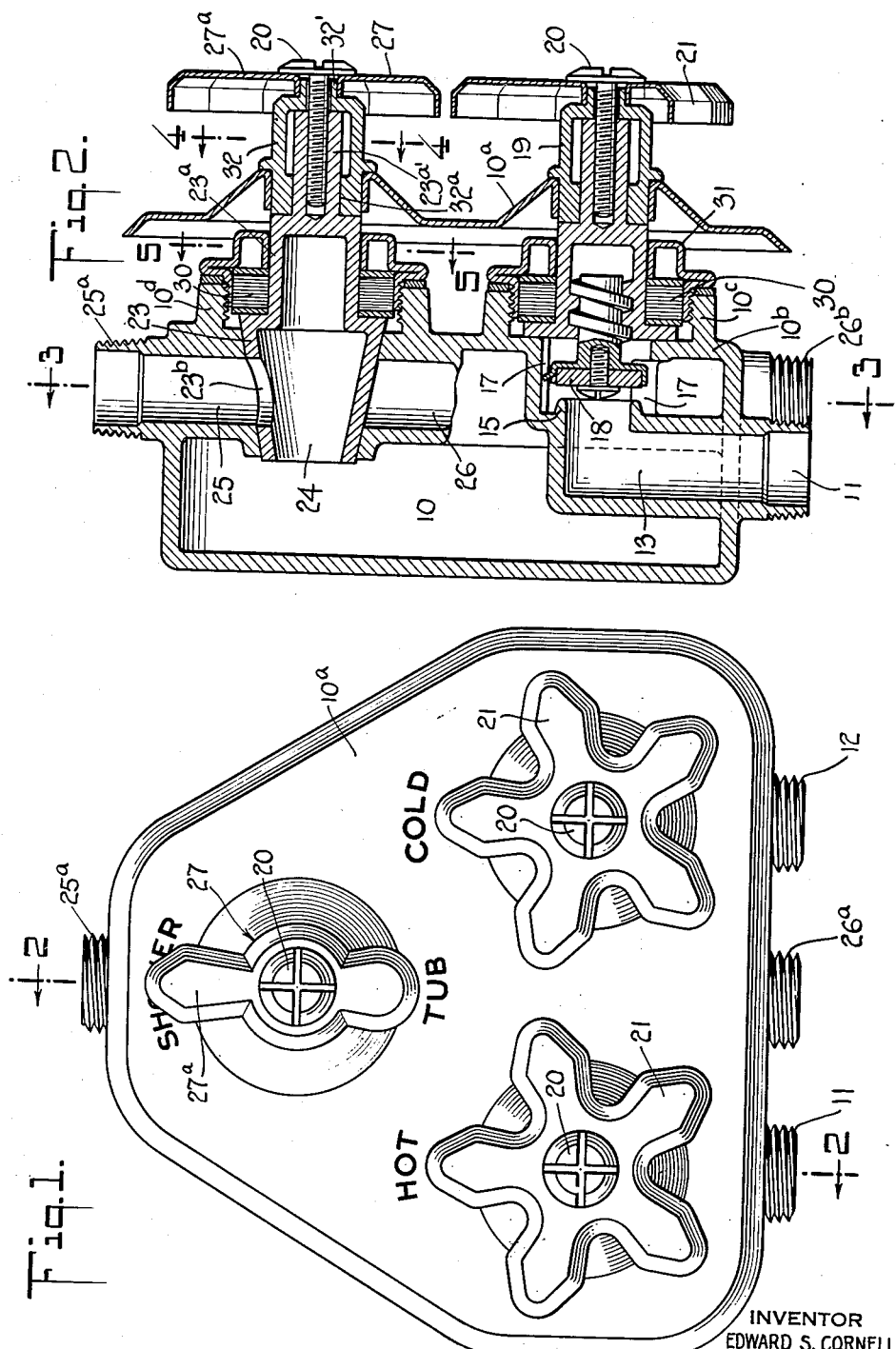
INVENTOR
EDWARD S. CORNELL, JR.
BY
HIS ATTORNEY

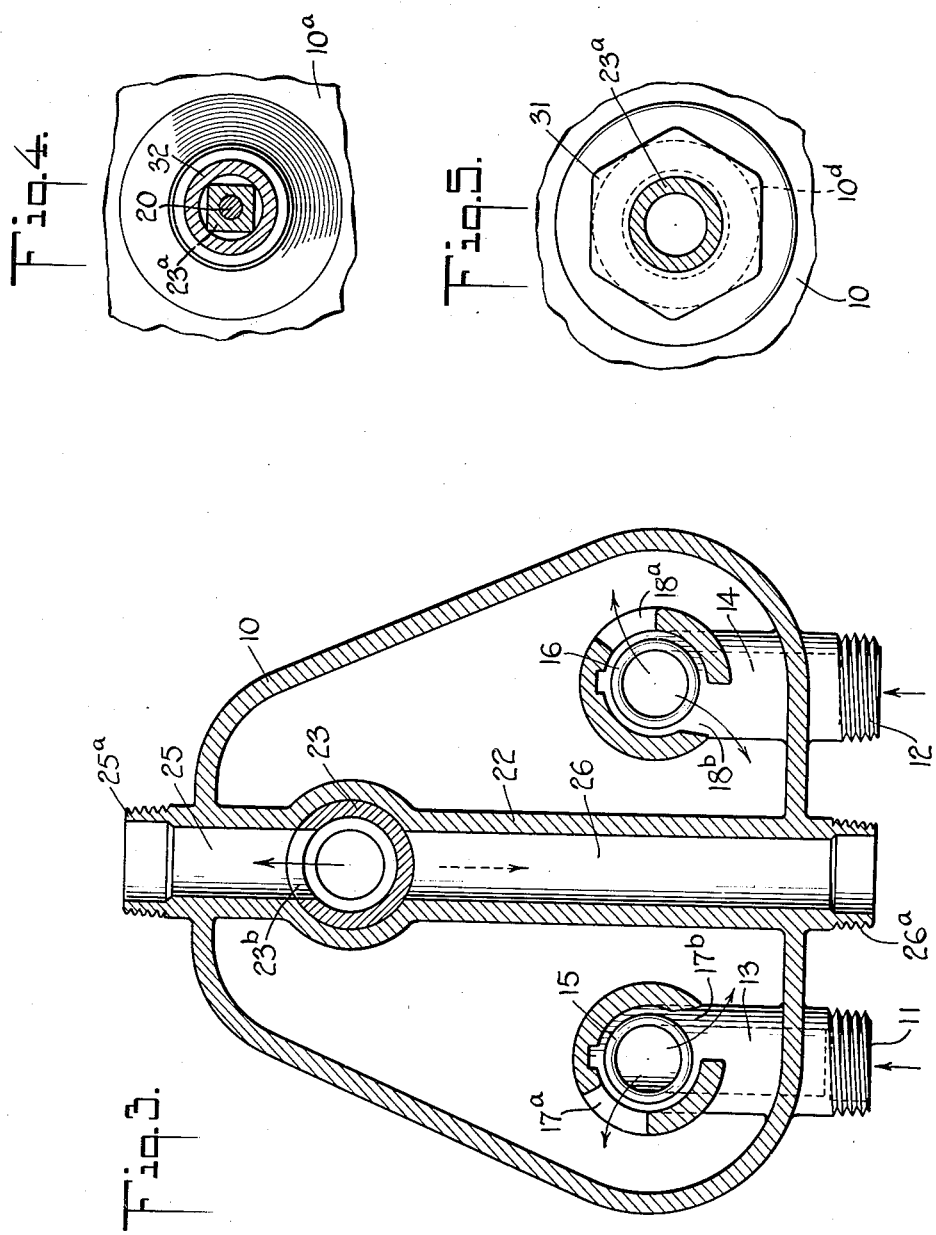
Feb. 25, 1936. E. S. CORNELL, JR 2,031,932
COMBINED DIVERTING AND HOT-COLD CONTROL FIXTURE
Filed Jan. 23, 1934 2 Sheets-Sheet 2
INVENTOR
EDWARD S. CORNELL, JR.
BY
ATTORNEY Patented Feb. 25, 1936

2,031,932

UNITED STATES PATENT OFFICE 2,031,932

COMBINED DIVERTING AND HOT-COLD CONTROL FIXTURE

Edward S. Cornell, Jr., Larchmont, N. Y., assignor to American Radiator Company, New York, N. Y., a corporation of New Jersey Application January 23, 1934, Serial No. 707,872

3 Claims. (Cl. 277—50)

My present invention relates to a combined diversion and hot-cold control device.

More particularly, my invention relates to a fixture applicable to be connected with pipe lines serving heated and unheated water, and having appropriate valves for controlling the relative quantities of such heated and unheated water, and passage means within or directly associated with the casing and provided with valve means for controlling dually the direction and the extent of the flow of the inter-mixed heated and unheated water, to either of two appropriate locations, such as tub and shower, tub and basin, shower and basin, etc., with which the fixture is piped.

The most preferred forms of my invention embody a casing, nipples and chambers extending into the casing for the respective "hot" and "cold" pipe lines, valve seats respectively disposed within the casing for such chambers, movable valve members, preferably appropriately designated "hot" and "cold" which cooperate with such valve seats for the control of inflow of the heated and unheated water, suitable means for effectively intermixing the heated and unheated water within the interior of the casing, passage means for connection to the lines of piping leading to two diversified locations, such passage means having port means communicating with the interior of the casing, and valve means for such passage means provided with a movable valve member for dually controlling the direction of diversion of the flow of the intermixed heated and unheated water and the extent of such flow.

The invention, as is apparent, is not restricted to the control of water nor to the control of two streams of relatively heated water, but is applicable to the admixing of any two streams of liquid and the control of the divergent flow and the extent of such divergent flow.

An advantageous feature of certain types of embodiments of my invention resides in the combination with the casing into which the respective "hot" and "cold" water, or other two fluids, flow, of outflow passage means arranged to be connected to piping leading to two locations or use, and valve means for such outflow passage means affording, firstly, communication between the interior of the casing and the outflow passage means, secondly to select the terminus of the flow, and thirdly the extent of such diverted flow.

Further features and objects of the invention will be more fully understood from the following detail description and the accompanying drawings, in which Fig. 1 is a front elevation of a preferred form of my invention, illustrated as adaptable to a "hot-cold-shower-tub" fixture;

Fig. 2 is a vertical sectional elevation on the broken section line 2—2 of Fig. 1;

Fig. 3 is a vertical section on line 3—3 of Fig. 2;

Fig. 4 is a detail sectional elevation on line 4—4 of Fig. 2; and

Fig. 5 is a detail sectional elevation on line 5—5 of Fig. 2.

Referring to the illustrated preferred form of my invention, the casing 10 may be of any suitable configuration, that illustrated in Figs. 1 and 3, being generally triangular.

At the lower end, as appears in Figs. 1, 2 and 3, is provided the nipple portion 11 for connection with piping supplying heated, that is "hot", water, and the nipple portion 12 for connection with piping for supplying unheated, that is "cold", water. The nipples 11 and 12 are indicated as provided with threading and therefore affording connection with piping by threaded pipe fittings; however, such connection may be by sweat joint or any other form of present day or other approved type of connection. The nipple portions 11, 12 communicate with the respective chambers 13, 14, in turn terminating at their valve seats 15, 16, respectively, see Figs. 2 and 3.

Referring to Figs. 2 and 3, the chamber 13 communicates through the opening of its valve seat 15 with its outflow chamber 17, preferably provided with oppositely directed outflow ports 17a, 17b, or equivalent, leading into the interior of the casing 10. The control of the outflow through the opening of the valve seat 15 is had by any suitable valve means. As illustrated in Fig. 2, such valve means comprises the movable valve member 18 carried by the rotatable stem 19, secured as by a screw 20 to its operating handle 21.

Correspondingly, the outflow chamber communicating through the opening of the valve seat 16 of the chamber 14 is provided with suitable ports 18a, 18b, see Fig. 3, preferably projecting the discharge in oppositely directed streams, thus cooperating with the oppositely directed ports 17a and 17b to effectively intermix the two streams within the casing 10. For such purpose, it will be observed, the ports 17b and 18b are directed in a downward direction, and the ports 17a and 18a are directed in a general upward direction, thus precluding any stratification of unheated water in the lower portion of the casing and heated water in the upper portion of the casing.

Directly associated with the casing 10, and preferably a unitary part therewith, I provide passage means 22 and a valve 23 therefor, such passage means communicating, as through a port 24, see Fig. 2, specifically through the movable valve member 23a, with the interior of the casing 10. The passage means 22 is further provided with extensions 25, 26, for connection respectively with piping leading to any two appropriate locations of discharge or use, such as one piping leading to a shower and the other piping leading to a tub, for which particular diverting use the fixture illustrated in Fig. 1 bears the legends "Shower" and "Tub".

The terminal or nipple portion 25a of the extension 25 and the nipple portion 26a of the extension 26 may be threaded, as indicated in Figs. 1 and 3, or may be connected to the piping by sweat joint or any other suitable form of connection.

The stem 23a of the diverting valve 23 is provided with any suitable form of operating handle 27, desirably to have an index portion 27a, see Fig. 1, and thus indicate the direction of diversion effected by the valve 23 at its various positions of setting. For such or other purpose, the discharge port 23b of the diverting valve 23, see Figs. 2 and 3, is arranged in operative position to correspond to the index portion 27a. In the position illustrated in Figs. 2 and 3, the discharge port 23b communicates with the extension 25 of the passage means 22, thus directing the flow of the fluid from the interior of the casing 10 into the piping leading, in this instance, to the shower, the path of flow being specifically through the inflow port 24, thence through the body of hollow movable valve member 23, thence through the discharge port 23b, into and through the extension 25 of passage means 22, and thus into the piping leading to the shower.

It will be further observed that rotation of the movable valve member 23 continued from its position shown in Figs. 2 and 3 effects more and more the restriction of the extent of effective communication of its discharge port 23b with the extension 25 of the passage means 22, thus restricting the flow to any desired extent. Correspondingly, upon rotating the operating handle 27 to move its index portion 27a, say one hundred and eighty angular degrees from its position as shown in Fig. 1, the discharge port 23b is brought into more and more effective communication with the extension 26 of the passage means 22, thus diverting the water to corresponding extent of flow to the "Tub".

As illustrated in the drawings, the discharge port 23b is preferably of a range of angular opening to provide at any setting flow, and of regulated extent, exclusively into either of the two extensions and the corresponding location of ultimate discharge.

It will be observed that the general triangular configuration of the casing 10, coupled with the location of the diverting valve 23 toward the upper apex of such triangular outline, see Fig. 3, the discharges of the "hot" and the "cold" valves being located at the base of such triangular configuration on opposing sides of the port 24, and at substantially equal distance from the diverting valve, is effective for insuring complete intermixing of the two flows into the casing and substantial uniformity of temperature through the port 24, for any given settings of the inflow valves 15 and 16 and the outflow valve 23.

As appears from the above, the specific construction and the material of the detail parts of my invention may be selected as preferred and pursuant to the requirements of commercial operation conditions well understood by those skilled in the art. Desirably, the casing and the valve and other parts of embodiments of my invention are formed of metal, either cast to desired forms or of suitably shaped wrought metal or equivalent.

To afford convenience of assembly, and also for disassembly in the circumstance of repair, inspection or the like, it is convenient to provide a face plate 10a of stamped or shaped wrought metal, separate from the casing proper 10, in which form of manufacture the front face portion 10b of the casing proper 10 may be provided with nipple formations 10c, 10c for the respective inflow valves 16, 17 and a similar nipple formation 10d for the outflow or diversion valve 23, a gasket 30 being interposed between each movable valve stem within its nipple formation, and locked by a washer or lock-nut 31 or equivalent, as is indicated in Fig. 5 with respect to the outflow or diversion valve 23.

Such front plate 10a may desirably be stamped with the legends "Hot", "Cold", "Shower" and "Tub", or equivalent designations.

Coacting with such front plate 10a, I may also provide for each movable valve stem a hollow boss 32 having an outer terminal portion 32' of square or other polygonal contour for securement thereto by a set screw 20 of the respective operating handles (21, 21, for the two inflow valves and 27 of the outflow or diversion valve), each handle being provided with a correspondingly contoured opening, and each boss 32 has an inner terminal portion 32a of squared or other polygonal contour, receiving a correspondingly contoured outer stem portion, see 23a', Fig. 4, of the movable valve stem 23a, whereby upon grasping and turning an operating handle, the torque is transmitted through the stated respective mating polygonally contoured parts, the set screw 20 serving merely to hold the stated parts in operative relation.

Whereas I have described my invention by reference to specific forms thereof, it will be understood that many changes and modifications may be made without departing from the spirit of the invention.

I claim:

1. A diverting fixture comprising a substantially flat casing provided with a hollow interior constituting a relatively large mixing chamber, an inflow pipe for cold fluid and an inflow pipe for hot fluid, spaced apart from each other and extending through a wall of the casing into one end of the mixing chamber, valve means at the inner end of each of the inflow pipes for controlling the flow of fluid into the mixing chamber, ports associated with each of the said valve means, each directing the flow of fluid into the mixing chamber in a plurality of streams, an outflow passage means in said mixing chamber and extending throughout the length of the said chamber and arranged to be connected to separate piping leading to a plurality of locations, and valve means for dually effecting communication of said outflow passage means with the mixing chamber and for selective flow through said separate piping respectively.

2. A diverting fixture comprising a substantially flat casing, provided with a relatively large hollow interior constituting a fluid mixing chamber, an inflow pipe for hot fluid, and an inflow pipe for cold fluid extending through a wall of the casing into the mixture chamber, valve means at the inner end of each of the inflow pipes for controlling the passage of fluid into the mixing chamber, ports associated with each said valve means for directing the fluid in streams into the mixing chamber, outflow passage means extending within and embraced by the fluid within said mixing chamber arranged to be connected to separate piping leading to two locations, and valve means for dually effecting communication of said outflow means with the mixing chamber and for selective flow through said separate piping respectively.

3. A diverting fixture comprising a casing provided with a hollow interior constituting a relatively large mixing chamber, an inflow pipe and another inflow pipe spaced apart from each other and extending through a wall of the casing into one end of the mixing chamber, valve means at the inner end of each of the inflow pipes for controlling the flow of fluid into the mixing chamber, a plurality of ports associated with said valve means for directing the flow of fluid into the mixing chamber in a plurality of streams and in different directions to facilitate the intermingling of the fluids, outflow passage means in and communicating with the mixing chamber and extending throughout the length of the casing and arranged to be connected to separate piping leading to a plurality of locations, and valve means for dually effecting communication of said outflow passage means with the mixing chamber and for selective flow through said separate piping respectively.

EDWARD S. CORNELL, Jr.